United States Patent

Hirai et al.

(10) Patent No.: US 6,232,683 B1
(45) Date of Patent: May 15, 2001

(54) ALTERNATOR WITH COOLING AIR GUIDE FORMED BY BEARING HOUSING HAVING GUIDING PORTION

(75) Inventors: Koichi Hirai; Katsumi Adachi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/481,975

(22) Filed: Jan. 13, 2000

(30) Foreign Application Priority Data

Jul. 29, 1999 (JP) .................................................. 11-215283

(51) Int. Cl.⁷ .............................. H02K 9/00; H02K 9/06
(52) U.S. Cl. ................................ 310/59; 310/62; 310/65; 310/89
(58) Field of Search ........................ 310/68 D, 62, 310/61, 52, 60 R, 58, 59, 89, 64; 363/145

(56) References Cited

U.S. PATENT DOCUMENTS

| 4,659,950 | * | 4/1987 | Gotoh | 310/59 |
| 5,028,826 | * | 7/1991 | Kitamura | 310/51 |
| 5,095,235 | * | 3/1992 | Kitamura | 310/68 D |
| 5,194,770 | * | 3/1993 | Yoshioka et al. | 310/51 |

FOREIGN PATENT DOCUMENTS

| 907932 | 3/1960 | (GB) . |
| 5-2561 | 1/1993 | (JP) . |

* cited by examiner

Primary Examiner—Tran Nguyen
(74) Attorney, Agent, or Firm—Sughrue, Mion, Zinn, Macpeak & Seas, PLLC

(57) ABSTRACT

In an automotive alternator, a thick-walled guide portion for guiding external air from an opening towards a heat sink main body is formed opposite fins on part of an outer circumferential portion of a bearing housing portion of a rear bracket.

6 Claims, 8 Drawing Sheets

ALTERNATOR WITH COOLING AIR GUIDE FORMED BY BEARING HOUSING HAVING GUIDING PORTION

BACKGROUND OF THE INVENTION

1. Field of the Invention

The present invention relates to an alternator comprising a rectifier cooled by external air drawn in through openings in a bracket by the rotation of a fan secured to a rotor.

2. Description of the Related Art

FIG. 9 is a cross section of a conventional automotive alternator, FIG. 10 is a perspective of the rectifier in FIG. 9, and FIG. 11 is a perspective of the bearing housing portion in FIG. 9.

This automotive alternator includes: a case 3 comprising an aluminum rear bracket 1 and an aluminum front bracket 2; a shaft 6 rotatably supported by a first bearing 31 inserted into a bearing housing portion 30 in the rear bracket 1 which constitutes a first bracket and a second bearing 33 inserted into a bearing housing portion 32 in the front bracket 2 which constitutes a second bracket, a pulley 4 being secured to one end of the shaft 6; a Lundell-type rotor 7 secured to the shaft 6; a stator 8 secured to an inner wall of the case 3; slip rings 9 secured to the other end of the shaft 6 for supplying electric current to the rotor 7; a pair of brushes 10 moving in contact with the slip rings 9; a brush holder 11 accommodating the brushes 10; a rectifier 12 electrically connected to the stator 8 for converting alternating current generated in the stator 8 into direct current; a heat sink 17 fitted over the brush holder 11; and a regulator 18 attached to the heat sink by adhesive for adjusting the alternating current generated in the stator 8.

The rotor 7 includes: a rotor coil 13 for generating magnetic flux by passing electric current therethrough; and a pole core 14 disposed so as to cover the rotor coil 13 in which magnetic poles are produced by the magnetic flux generated by the rotor coil 13. The pole core 14 includes a first pole core assembly 21 and a second pole core assembly 22 which mutually interlock. Centrifugal fans 5 for cooling are welded to the axial ends of the first pole core assembly 21 and second pole core assembly 22.

The stator 8 includes: a stator core 15; and a stator coil 16 composed of wire wound onto the stator core 15 in which alternating current is generated by changes in the magnetic flux from the rotor coil 13 as the rotor 7 rotates.

The rectifier 12 includes: a positive-side heat sink 24 comprising an arc-shaped heat sink main body 24a and a plurality of fins 24b standing on the reverse side of the heat sink main body 24a; four positive-side diodes 23 composed of molded resin secured by soldering to the upper surface of the positive-side heat sink main body 24a; an arc-shaped negative-side heat sink 26 grounded by being secured to the rear bracket 1; four negative-side diodes 25 composed of molded resin secured by soldering to the negative-side heat sink 26; and a circuit board 27 for electrically connecting each of the diodes 23 and 25 to the stator coil 16, the rectifier 12 converting the three-phase alternating current generated by the stator 8 into a direct current.

The positive-side heat sink 24 and the negative-side heat sink 26 are disposed on a generally flat plane in the radial direction of the shaft 6, and are housed inside the case 3. The positive-side heat sink 24 and the negative-side heat sink 26 are composed of aluminum which has high thermal conductivity.

In a vehicle alternator of the above construction, a current is supplied by a battery (not shown) through the brushes 10 and slip rings 9 to the rotor coil 13, whereby magnetic flux is generated, giving rise to a magnetic field and at the same time, the pulley 4 is driven by the engine and the rotor 7 is rotated by the shaft 6, so that a rotating magnetic field is imparted to the stator coil 16 and electromotive force is generated in the stator coil 16. This alternating electromotive force passes through the positive-side diodes 23 and the negative-side diodes 25 of the rectifier 12 and is converted into direct current, the magnitude thereof is adjusted by the regulator 18, and the battery is recharged.

While the alternator is generating power, the rotor coil 13, the stator coil 16, the positive-side diodes 23, the negative-side diodes 25, and the regulator 18 are constantly generating heat. For example, in an alternator with a rated output current in the 100 A class, the amount of heat generated is 60 W in the rotor coil 13, 500 W in the stator coil 16, a total of 120 W in the positive-side diodes 23 and the negative-side diodes 25, and 6 W in the regulator 18. The excessive generation of heat causes deterioration in the performance of the alternator and reduces the working life of the parts.

For that reason, the fans 5 are rotated together with the rotation of the rotor 7, external air introduced into the case 3 from openings A1 and A2 in the case 3 by this rotation flows as indicated by the arrows α and β in FIG. 9, mainly cooling the positive-side heat sink 24 and the positive-side diodes 23. The external air then flows radially outwards from the fans 5, cools the end portions of the stator coil 16 in the rear end, and is expelled to the outside through openings B.

External air is also introduced into the case 3 from openings C by the rotation of the fans 5, and the external air flows as indicated by the arrow γ in FIG. 9, cooling the power transistors of the regulator 18. The external air then flows radially outwards from the fans 5, cools the end portions of the stator coil 16 in the rear end, and is expelled to the outside through openings D.

Similarly, external air introduced through openings E in the front bracket 2 flows radially outwards from the fans 5, cooling the end portions of the stator coil 16 in the front end. The external air is then expelled outside the case 3 through openings F.

In an automotive alternator of the above construction, external air flowing into the case 3 through the openings Al flows axially along the cylindrical wall 30a of the bearing housing portion 30 and then flows radially outwards, and one problem has been that the cooling efficiency for the positive-side diodes 23 has been poor because the amount of air striking the positive-side heat sink 24 is small and very little contributes to the cooling of the positive-side diodes 23.

Another problem has been that because the external air flows along flows axially along the curved cylindrical wall 30a of the bearing housing portion 30 and the surface area of the cylindrical wall 30a is small, the temperature of the first bearing 31 rises and the working life of the first bearing 31 is shortened.

SUMMARY OF THE INVENTION

The present invention aims to solve the above problems and an object of the present invention is to provide an alternator in which the diodes are efficiently cooled and temperature increases in the bearings are suppressed.

To this end, according to the present invention, there is provided an alternator comprising: a case comprising a first bracket and a second bracket; a shaft, one end of the shaft being rotatably supported by a first bearing disposed in a bearing housing portion of the first bracket, and the other end of the shaft being rotatably supported by a second bearing disposed in a bearing housing portion of the second bracket; a rotor secured to the shaft; a stator comprising a stator core secured to an inner wall of the case and a stator coil composed of wire wound onto the stator core; a rectifier for converting alternating current generated in the stator coil into direct current, the rectifier being disposed inside the case and electrically connected to the stator coil; and a fan secured to the rotor for cooling the rectifier by drawing in external air through an opening in the first bracket by rotation of the rotor, the rectifier comprising a heat sink having fins disposed on a rear surface of a heat sink main body, and a number of diodes secured to a surface of the heat sink main body, and a thick-walled guide portion for guiding external air from the opening towards the heat sink main body, the thick-walled portion being formed opposite the fins on part of an outer circumferential portion of the bearing housing portion of the first bracket.

According to another aspect of the present invention, there is provided an alternator comprising: a case comprising a first bracket and a second bracket; a shaft, one end of the shaft being rotatably supported by a first bearing disposed in a bearing housing portion of the first bracket, and the other end of the shaft being rotatably supported by a second bearing disposed in a bearing housing portion of the second bracket; a rotor secured to the shaft; a stator comprising a stator core secured to an inner wall of the case and a stator coil composed of wire wound onto the stator core; a rectifier for converting alternating current generated in the stator coil into direct current, the rectifier being disposed inside the case and electrically connected to the stator coil; and a fan secured to the rotor for cooling the rectifier by drawing in external air through an opening in the first bracket by rotation of the rotor, the rectifier comprising a heat sink having fins disposed on a rear surface of a heat sink main body, and a number of diodes secured to a surface of the heat sink main body, and a number of fins being disposed on an outer circumferential portion of the bearing housing portion of the first bracket.

DETAILED DESCRIPTION OF THE PREFERRED EMBODIMENTS

Figure 9:
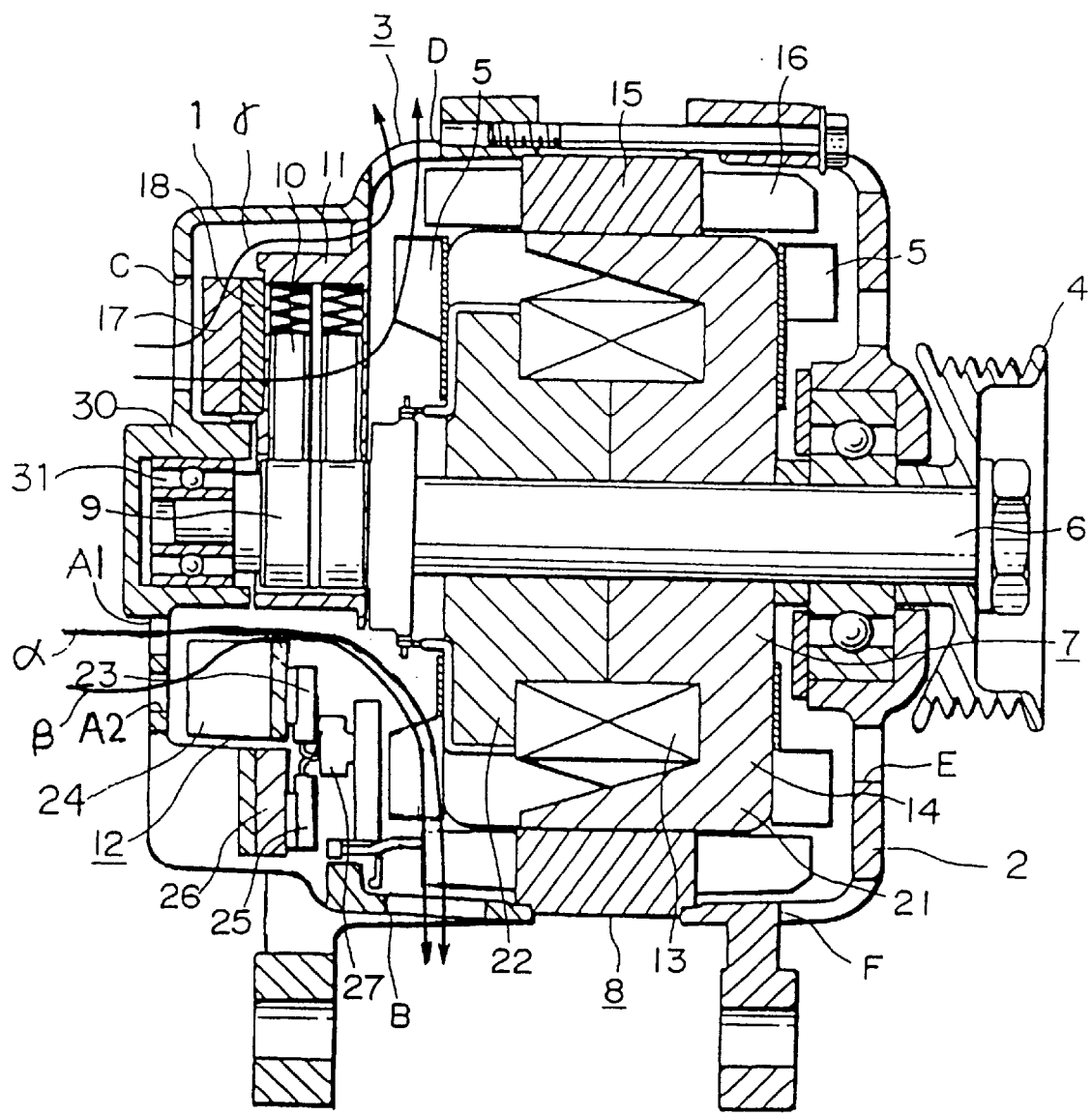
FIG. 9 is a cross section of a conventional automotive alternator.
Figure 10:
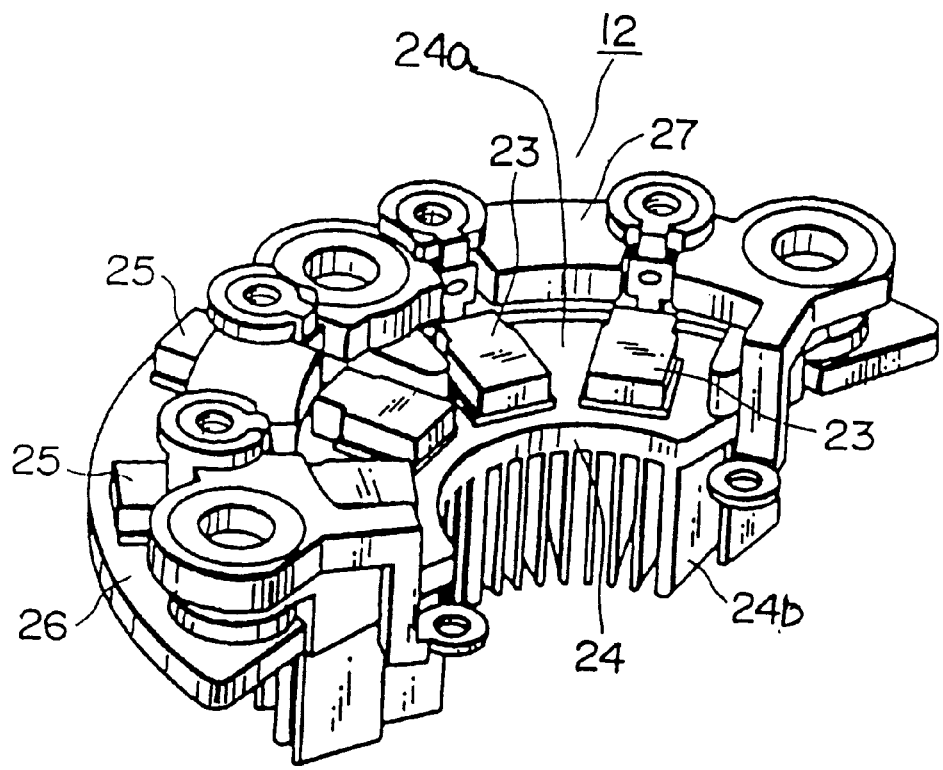
FIG. 10 is a perspective of the rectifier in FIG. 9.
Figure 11:
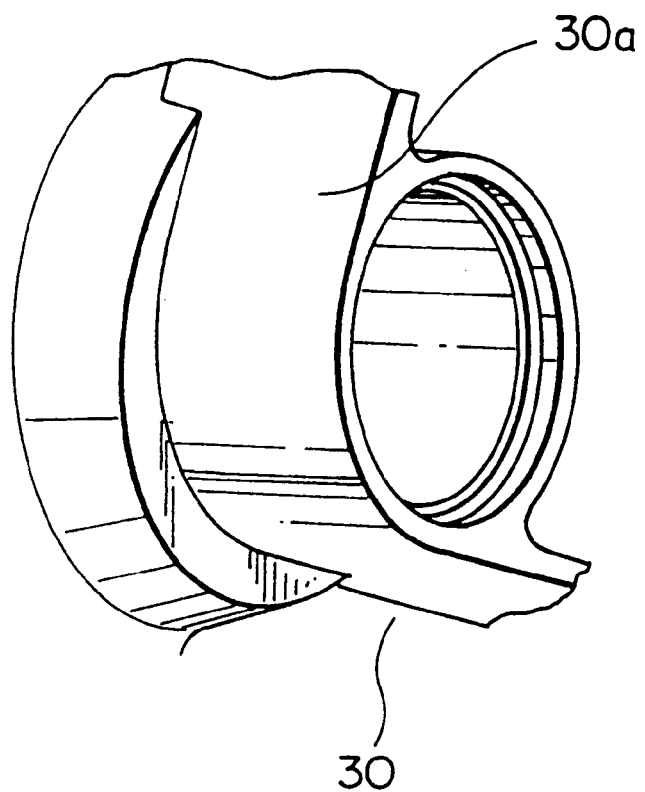
FIG. 11 is a perspective of the bearing housing portion in FIG. 9.

An automotive alternator according to the present invention will be explained below, and parts the same as or corresponding to those in the conventional example shown in FIGS. 9 and 10 will be given the same numbering.

Embodiment 1

Figure 1:
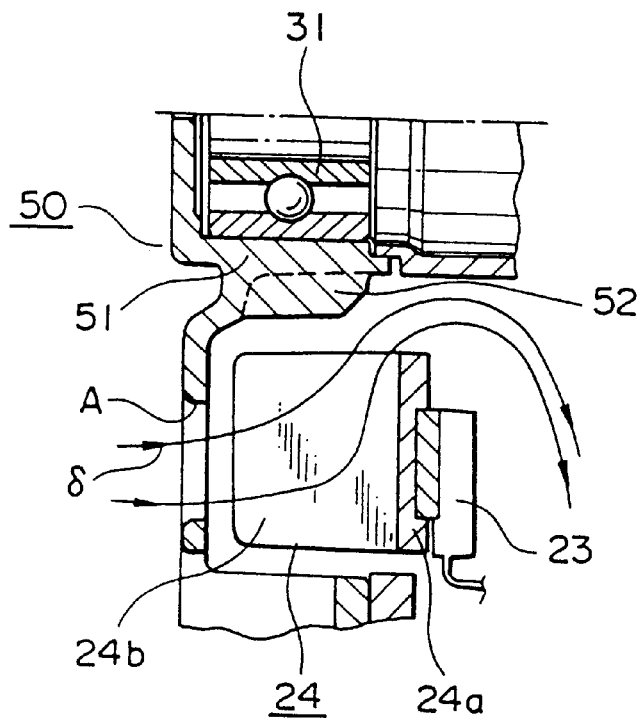
FIG. 1 is a partial cross section of an automotive alternator according to Embodiment 1 of the present invention.
Figure 2:
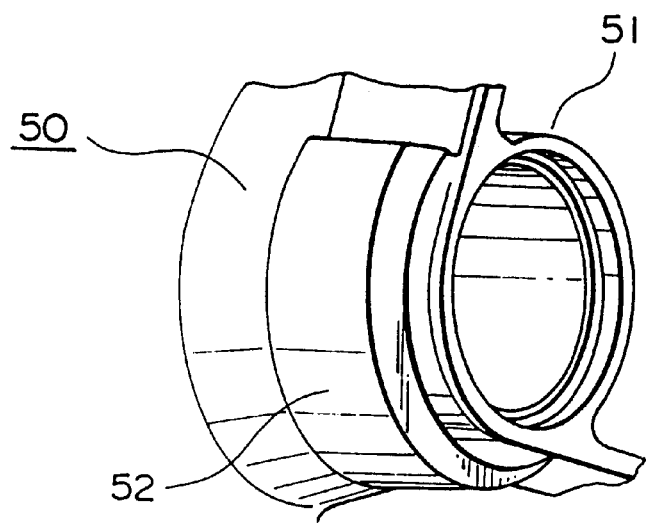
FIG. 2 is a perspective of the bearing housing portion in FIG. 1.
Figure 3:
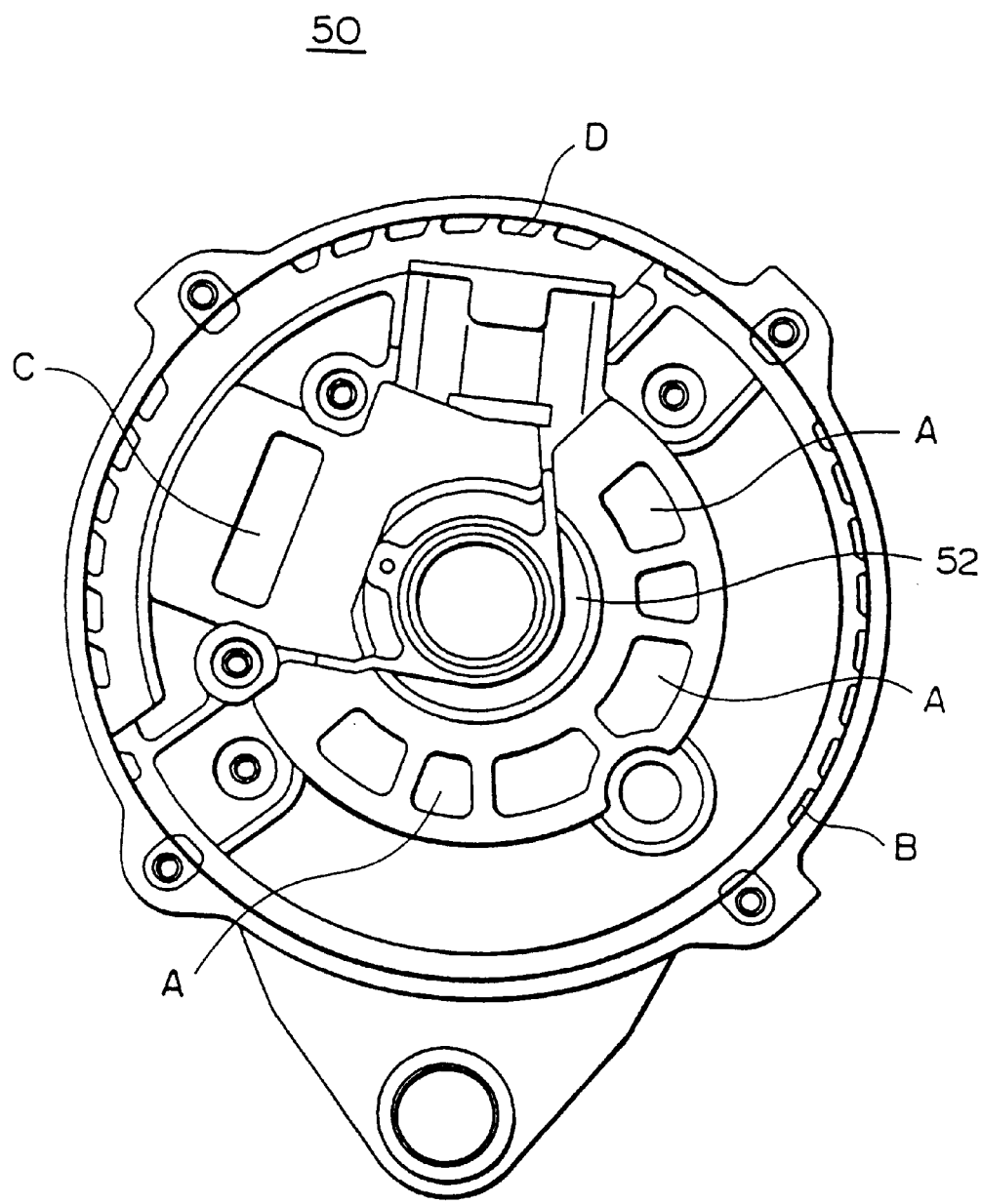
FIG. 3 is a front elevation of the rear bracket in FIG. 1.

FIG. 1 is a partial cross section of an automotive alternator according to Embodiment 1 of the present invention, FIG. 2 is a partial perspective of FIG. 1, and FIG. 3 is a front elevation of the rear bracket in FIG. 1.

This automotive alternator includes: a case 3 comprising an aluminum rear bracket 50 and an aluminum front bracket 2; a shaft 6 rotatably supported by a first bearing 31 inserted into a bearing housing portion 51 in the rear bracket 50 which constitutes a first bracket and a second bearing 33 inserted into a bearing housing portion 32 in the front bracket 2 which constitutes a second bracket, a pulley 4 being secured to one end of the shaft 6; a Lundell-type rotor 7 secured to the shaft 6; a stator 8 secured to an inner wall of the case 3; slip rings 9 secured to the other end of the shaft 6 for supplying electric current to the rotor 7; a pair of brushes 10 moving in contact with the slip rings 9; a brush holder 11 accommodating the brushes 10; a rectifier 12 electrically connected to the stator 8 for converting alternating current generated in the stator 8 into direct current; a heat sink 17 fitted over the brush holder 11; and a regulator 18 attached to the heat sink by adhesive for adjusting the alternating current generated in the stator 8.

The rotor 7 includes: a rotor coil 13 for generating magnetic flux by passing electric current therethrough; and a pole core 14 disposed so as to cover the rotor coil 13 in which magnetic poles are produced by the magnetic flux generated by the rotor coil 13. The pole core 14 includes a first pole core assembly 21 and a second pole core assembly 22 which mutually interlock. Centrifugal fans 5 for cooling are welded to the axial ends of the first pole core assembly 21 and second pole core assembly 22.

The stator 8 includes: a stator core 15; and a stator coil 16 composed of wire wound onto the stator core 15 in which alternating current is generated by changes in the magnetic flux from the rotor coil 13 as the rotor 7 rotates.

The rectifier 12 includes: a positive-side heat sink 24 comprising an arc-shaped heat sink main body 24a and a plurality of fins 24b standing on the reverse side of the heat sink main body 24a; four positive-side diodes 23 composed of molded resin secured by soldering to the upper surface of the positive-side heat sink main body 24a; an arc-shaped negative-side heat sink 26 grounded by being secured to the rear bracket 1; four negative-side diodes 25 composed of molded resin secured by soldering to the negative-side heat sink 26; and a circuit board 27 for electrically connecting each of the diodes 23 and 25 to the stator coil 16, the rectifier 12 converting the three-phase alternating current generated by the stator 8 into a direct current.

The positive-side heat sink 24 and the negative-side heat sink 26 are disposed on a generally flat plane in the radial direction of the shaft 6, and are housed inside the case 3. The positive-side heat sink 24 and the negative-side heat sink 26 are composed of aluminum which has high thermal conductivity.

A number of openings A are formed in the rear bracket 50, which constitutes a first bracket, directly in front of the arc-shaped positive-side heat sink main body 24a. A thick-walled guide portion 52 for guiding external air from the openings A towards the heat sink main body 24a is formed opposite the fins 24b in a portion of the outer circumference of the bearing housing portion 51 of the rear bracket 50. The rear bracket 50 and the front bracket 2 are made of die-cast aluminum.

In an automotive alternator of the above construction, the fans 5 are rotated together with the rotation of the rotor 7, external air from the openings A in the rear bracket 50 flows as indicated by the arrows δ in FIG. 1 due to this rotation, cooling the positive-side heat sink 24 and the positive-side diodes 23. The external air then flows radially outwards from the fans 5, cools the end portions of the stator coil 16 in the rear end, and is expelled to the outside.

Because a large volume of external air is guided towards the positive-side heat sink 24 by the guide portion 52 on the bearing housing portion 51 in this manner, the positive-side diodes 23 are cooled efficiently. Furthermore, because the openings A are formed directly in front of the heat sink main body 24a, the amount of external air striking the heat sink main body 24a directly is increased, improving the cooling efficiency for the positive-side diodes 23 proportionately.

Embodiment 2

Figure 4:
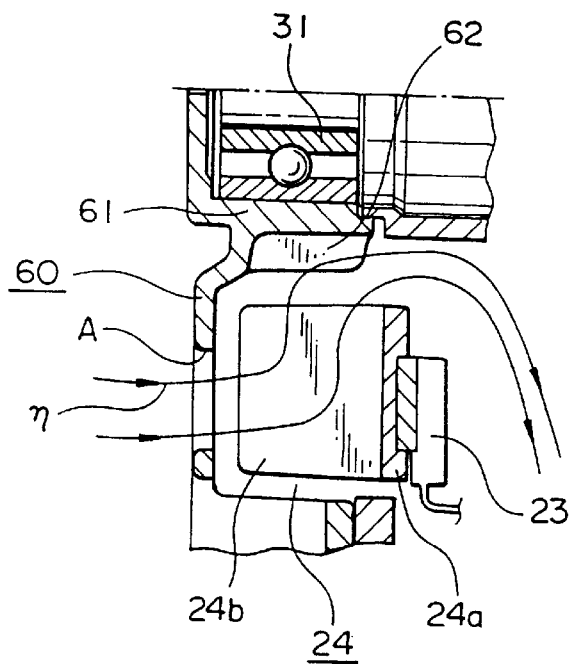
FIG. 4 is a partial cross section of an automotive alternator according to Embodiment 2 of the present invention.
Figure 5:
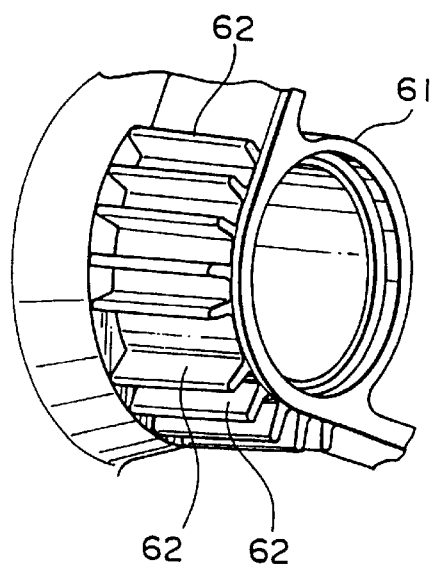
FIG. 5 is a perspective of the bearing housing portion in FIG. 4.
Figure 6:
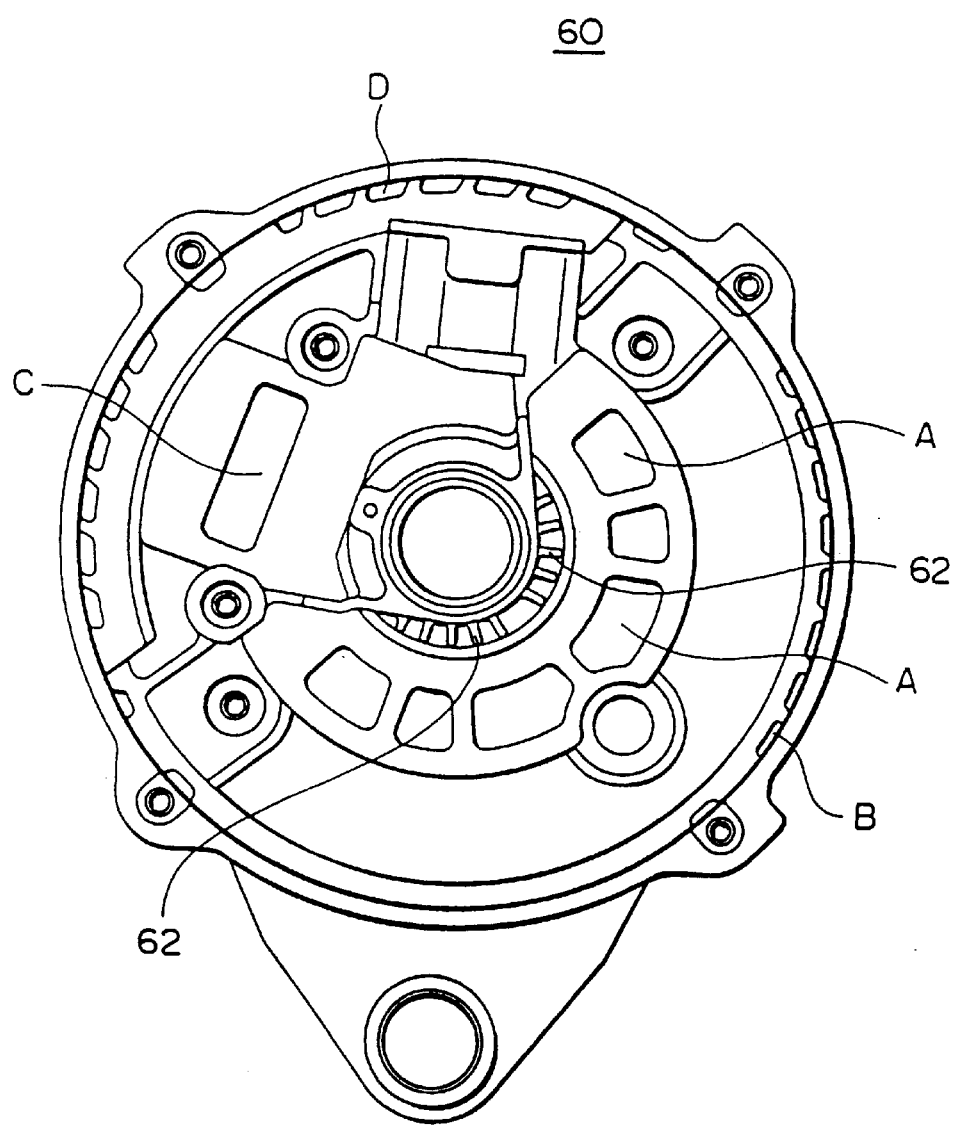
FIG. 6 is a front elevation of the rear bracket in FIG. 4.

FIG. 4 is a partial cross section of an automotive alternator according to Embodiment 2 of the present invention, FIG. 5 is a partial perspective of FIG. 4, and FIG. 6 is a front elevation of the rear bracket in FIG. 4.

In Embodiment 2, a number of openings A are formed in a rear bracket 60 opposite the arc-shaped positive-side heat sink main body 24a. A number of housing portion fins 62 extending radially are formed opposite the fins 24b in a portion of the outer circumference of the bearing housing portion 61 of the rear bracket 60. The number of the housing portion fins 62 is half the number of the fins 24b on the positive-side heat sink 24.

In Embodiment 2, the fans 5 are rotated together with the rotation of the rotor 7, external air from the openings A in the rear bracket 60 flows as indicated by the arrows η in FIG. 4 due to this rotation, cooling the positive-side heat sink 24 and the positive-side diodes 23.

Because the housing portion fins 62 are formed on the bearing housing portion 61 in this manner, the outer surface area of the bearing housing portion 61 is increased and heat from the first bearing 31 is efficiently expelled, improving the cooling efficiency for the first bearing 31.

Furthermore, the housing portion fins 62 act as resistance against the flow of the external air along the axis of the bearing housing portion 61, thus also improving the cooling efficiency for the positive-side diodes 23 by guiding more of the external air towards the positive-side heat sink 24.

Embodiment 3

Figure 7:
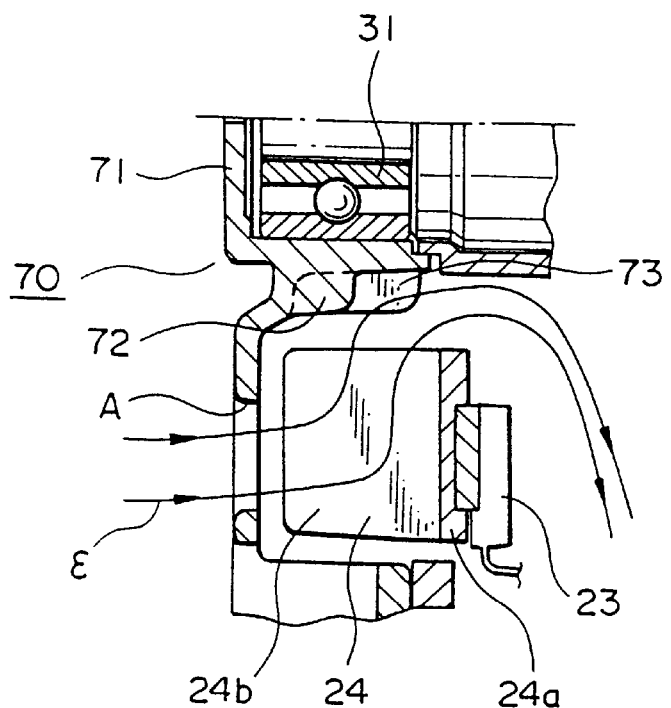
FIG. 7 is a partial cross section of an automotive alternator according to Embodiment 3 of the present invention.
Figure 8:
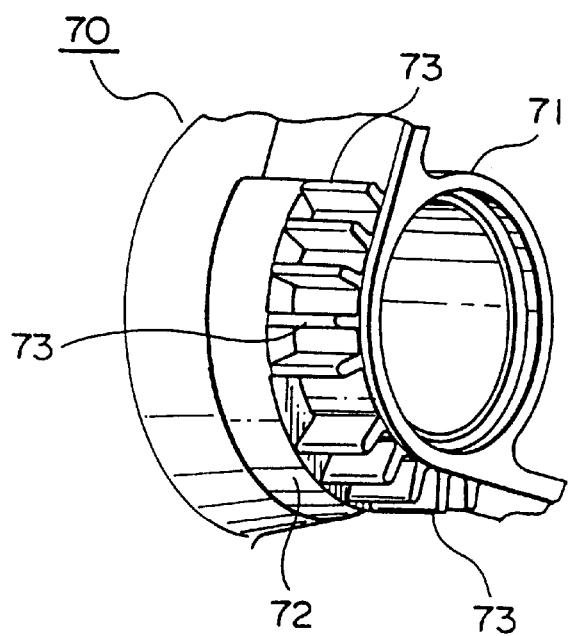
FIG. 8 is a perspective of the bearing housing portion in FIG. 7.

FIG. 7 is a partial cross section of an automotive alternator according to Embodiment 3 of the present invention, and FIG. 8 is a partial perspective of FIG. 7.

In Embodiment 3, a number of openings A are formed in a rear bracket 70 opposite the arc-shaped positive-side heat sink main body 24a. A thick-walled guide portion 72 is formed on the outer half of a cylindrical wall of a bearing housing portion 71 of the bracket 70, and a number of housing portion fins 73 extending radially are formed on the inner half of the cylindrical wall of the bearing housing portion 71. The guide portion 72 and the housing portion fins 73 are disposed opposite the fins 24b. The number of the housing portion fins 73 is half the number of the fins 24b on the positive-side heat sink 24.

In Embodiment 3, the fans 5 are rotated together with the rotation of the rotor 7, external air from the openings A in the rear bracket 70 flows as indicated by the arrows ε in FIG. 7 due to this rotation, cooling the positive-side heat sink 24 and the positive-side diodes 23.

Because the guide portion 72 is formed on the bearing housing portion 71 in this manner, a large volume of external air is guided towards the positive-side heat sink 24 by the guide portion 72 and the positive-side diodes 23 are cooled efficiently. Furthermore, because the housing portion fins 73 are formed on the bearing housing portion 71, the outer surface area of the bearing housing portion 71 is increased and heat from the first bearing 31 is efficiently expelled, improving the cooling efficiency for the first bearing 31.

Moreover, each of the above embodiments has been explained using an automotive alternator, but the present invention can naturally be applied to any other alternator. Furthermore, the present invention can also be applied to an automotive alternator in which the negative-side diodes are disposed radially inside and the positive-side diodes are disposed radially outside.

As explained above, an alternator according to one aspect of the present invention comprises a thick-walled guide portion for guiding external air from an opening towards a heat sink main body, the thick-walled portion being formed opposite fins on part of an outer circumferential portion of a bearing housing portion of a first bracket. Therefore, a large amount of air flows to the heat sink main body, improving the cooling efficiency for the diodes secured to the heat sink main body.

An alternator according to another aspect of the present invention comprises: a number of fins disposed on an outer circumferential portion of a bearing housing portion of a first bracket. Therefore, the outer surface area of the bearing housing portion is increased and heat from the first bearing is efficiently expelled, enabling the first bearing to be used over extended periods.

According to one form of the alternator, a number of housing portion fins may be disposed opposite the fins of the heat sink on part of an outer circumferential portion of the bearing housing portion of the first bracket. Therefore, the cooling efficiency for the diodes is improved and heat from the first bearing is efficiently expelled.

According to another form of the alternator, a number of housing portion fins extending in a radial direction of the shaft may be disposed with spacing in a circumferential direction. Therefore, external air flows smoothly from the openings to the heat sink main body, cooling the heat sink efficiently.

According to still another form of the alternator, a number of the openings in the first bracket may be formed opposite the heat sink main body. Therefore, a larger amount of air strikes the heat sink main body, cooling the heat sink efficiently.

According to another form of the alternator, the first bracket may be formed from die-cast aluminum. Therefore, a first bracket provided with a bearing housing portion can be formed simply with high precision.

What is claimed is:

1. An alternator comprising:

a case comprising a first bracket and a second bracket;

a shaft, one end of said shaft being rotatably supported by a first bearing disposed in a bearing housing portion of said first bracket, and the other end of said shaft being rotatably supported by a second bearing disposed in a bearing housing portion of said second bracket;

a rotor secured to said shaft;

a stator comprising a stator core secured to an inner wall of said case and a stator coil composed of wire wound onto said stator core;

a rectifier for converting alternating current generated in said stator coil into direct current, said rectifier being disposed inside said case and electrically connected to said stator coil; and a fan secured to said rotor for cooling said rectifier by drawing in external air through an opening in said first bracket by rotation of said rotor, said rectifier comprising a heat sink having fins disposed on a rear surface of a heat sink main body, and a number of diodes secured to a surface of said heat sink main body, and a thick-walled guide portion for guiding external air from said opening towards said heat sink main body, said thick-walled portion being formed opposite said fins on part of an outer circumferential portion of said bearing housing portion of said first bracket.

2. The alternator according to claim 1 wherein a number of housing portion fins are disposed opposite said fins of said heat sink on part of an outer circumferential portion of said bearing housing portion of said first bracket.

3. The alternator according to claim 2 wherein a number of housing portion fins extending in a radial direction of said shaft are disposed with spacing in a circumferential direction.

4. The alternator according to claim 1 wherein a number of said openings in said first bracket are formed opposite said heat sink main body.

5. The alternator according to claim 1 wherein said first bracket is formed from die-cast aluminum.

6. An alternator comprising:

a case comprising a first bracket and a second bracket;

a shaft, one end of said shaft being rotatably supported by a first bearing disposed in a bearing housing portion of said first bracket, and the other end of said shaft being rotatably supported by a second bearing disposed in a bearing housing portion of said second bracket;

a rotor secured to said shaft;

a stator comprising a stator core secured to an inner wall of said case and a stator coil composed of wire wound onto said stator core;

a rectifier for converting alternating current generated in said stator coil into direct current, said rectifier being disposed inside said case and electrically connected to said stator coil; and a fan secured to said rotor for cooling said rectifier by drawing in external air through an opening in said first bracket by rotation of said rotor, said rectifier comprising a heat sink having fins disposed on a rear surface of a heat sink main body, and a number of diodes secured to a surface of said heat sink main body, and a number of fins guiding external air from said opening towards said heat sink main body, said fins being disposed on an outer circumferential portion of said bearing housing portion of said first bracket.

* * * * *